US011095787B2

(12) United States Patent
Nishimura et al.

(10) Patent No.: US 11,095,787 B2
(45) Date of Patent: Aug. 17, 2021

(54) IMAGE READING APPARATUS

(71) Applicant: SEIKO EPSON CORPORATION, Tokyo (JP)

(72) Inventors: Yoichiro Nishimura, Kitakyushu (JP); Masaki Namiki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/031,638

(22) Filed: Sep. 24, 2020

(65) Prior Publication Data

US 2021/0099592 A1 Apr. 1, 2021

(30) Foreign Application Priority Data

Sep. 27, 2019 (JP) .............................. JP2019-176898

(51) Int. Cl.
*H04N 1/00* (2006.01)

(52) U.S. Cl.
CPC ..... *H04N 1/00602* (2013.01); *H04N 1/00018* (2013.01); *H04N 1/0062* (2013.01); *H04N 1/00665* (2013.01)

(58) Field of Classification Search
CPC ............ B65H 2220/01; B65H 2220/11; B65H 2511/30; B65H 2515/40; B65H 2515/805; B65H 2220/03; B65H 2511/514; B65H 2511/521; B65H 2301/42114; B65H 2301/4219; B65H 2801/06; B65H 33/04; B65H 1/00; B65H 1/025; B65H 2403/942; B65H 2404/133; B65H 2553/612; B65H 2701/1912; B65H 29/20; B65H 31/06; B65H 3/0653; B65H 3/0669; B65H 3/5246; B65H 7/06; B65H 7/08; B65H 83/02; B65H 83/025; G03G 15/0266; G03G 2215/0129; G03G 2215/021; G03G 15/0131; G03G 15/0189; G03G 15/1605; G03G 15/161; G03G 15/162; G03G 15/1635; G03G 15/5058; G03G 15/55; G03G 15/6552; G03G 2215/0119;

(Continued)

(56) References Cited

U.S. PATENT DOCUMENTS 5,433,425 A * 7/1995 Kubota ................ B65H 3/5261
271/9.12
6,276,677 B1 * 8/2001 Hommochi ............ B65H 45/18
270/32

(Continued)

FOREIGN PATENT DOCUMENTS

JP 3711069 B 8/2005

*Primary Examiner* — Negussie Worku
(74) *Attorney, Agent, or Firm* — Workman Nydegger

(57) ABSTRACT

A medium feeding apparatus includes a first feed roller, a second feed roller, a first separating roller, and a second separating roller. The medium feeding apparatus further includes a first curve forming portion that forms, in a medium, a curve in a width direction. The first curve forming portion is in contact with a medium at a portion upstream of a nip position between the feed rollers and the separating rollers in the feeding direction and at a portion between the first separating roller and the second separating roller in the width direction and a state in which the portion in contact with the medium is, with respect to the outer circumferential surfaces of the feed rollers, positioned in a rotation center direction of the feed rollers is maintained.

7 Claims, 14 Drawing Sheets

(58) Field of Classification Search
CPC ... G03G 2215/0164; G03G 2215/1614; G03G 2215/1623; G03G 2221/1642; G03G 15/02; G03G 15/025; G03G 15/5062; G03G 21/06; G03G 2221/00; H04N 1/00885; H04N 1/00888; H04N 1/00901; H04N 1/2346; H04N 1/295
USPC .................................................. 358/498, 497
See application file for complete search history.

(56) References Cited

U.S. PATENT DOCUMENTS

| | | | | |
|---|---|---|---|---|
| 6,581,925 | B1* | 6/2003 | Shea | B65H 3/0638 |
| | | | | 271/124 |
| 6,644,654 | B1* | 11/2003 | Mao | B65H 29/22 |
| | | | | 270/58.08 |
| 6,769,679 | B2* | 8/2004 | Ishibashi | B65H 27/00 |
| | | | | 271/109 |
| 7,883,086 | B2* | 2/2011 | Kamiya | B65H 31/26 |
| | | | | 271/220 |
| 2003/0063337 | A1 | 4/2003 | Shirai et al. | |
| 2005/0029732 | A1* | 2/2005 | Chang | B65H 3/0684 |
| | | | | 271/113 |
| 2020/0307929 | A1* | 10/2020 | Nishimura | B65H 3/0684 |

\* cited by examiner

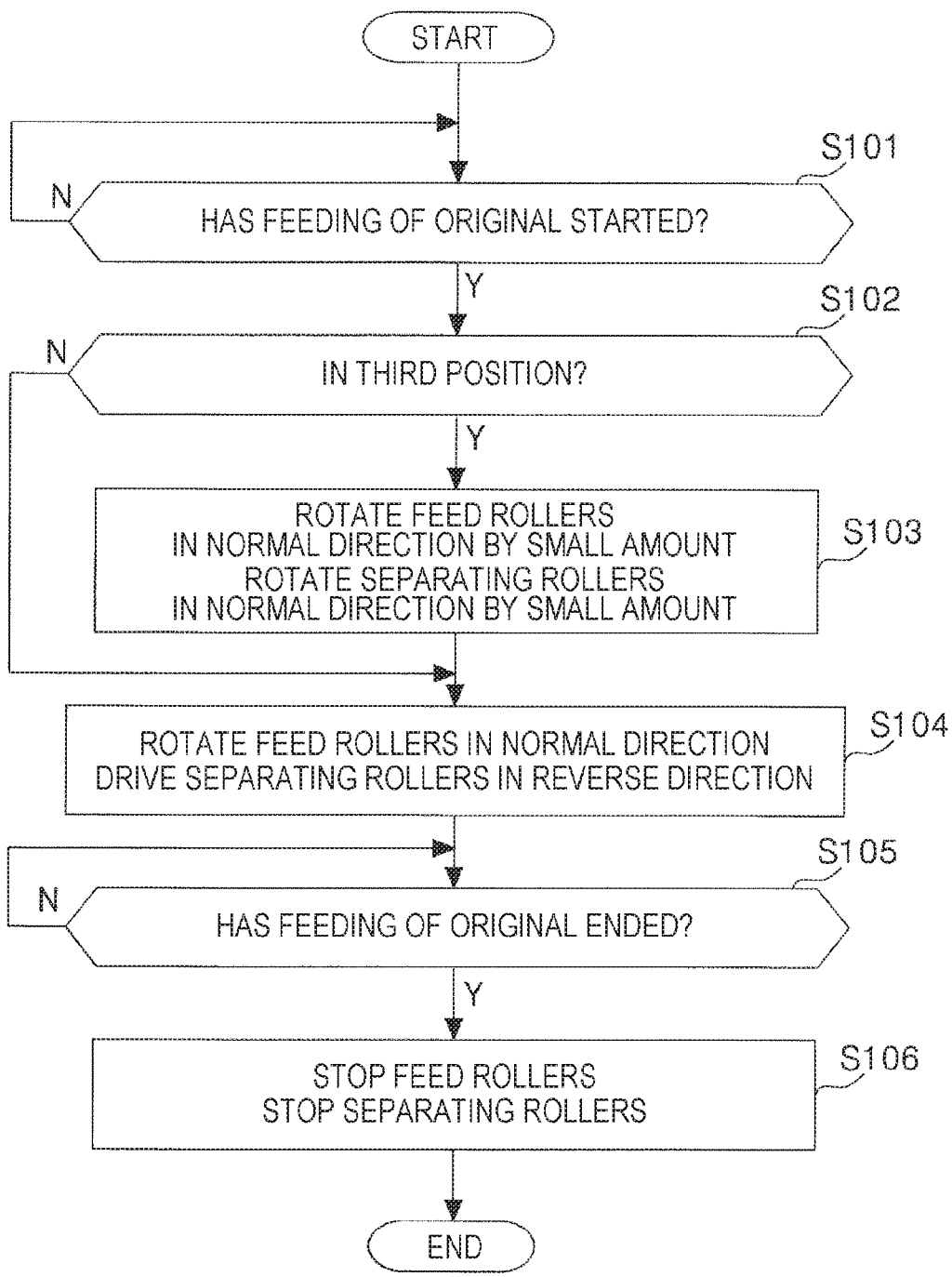

IMAGE READING APPARATUS

The present application is based on, and claims priority from JP Application Serial Number 2019-176898, filed Sep. 27, 2019, the disclosure of which is hereby incorporated by reference herein in its entirety.

BACKGROUND

1. Technical Field

The present disclosure relates to a medium feeding apparatus that feeds a medium, and an image reading apparatus including the same.

2. Related Art

A feeding apparatus that feeds a medium is provided in a scanner that is an example of an image reading apparatus and in a printer that is an example of a recording apparatus. As a method of separating mediums from each other in a feeding apparatus, there are cases in which a method is adopted in which the medium is sent out by nipping the medium between a separating roller to which rotational resistance or torque in the reverse direction is applied, and a feed roller that rotates in a direction that feeds the medium. Japanese Patent No. 3711069 discloses an example of such a feeding apparatus.

A feeding apparatus may adopt a method in which a medium at the lowest, among a plurality of mediums mounted on a medium mount portion, in other words, the medium at the bottom is sent out by contact thereto. Hereinafter, the medium that is at the lowest position and that is sent out is referred to as a preceding medium, and the medium above the preceding medium is referred to as a succeeding medium.

When the preceding medium is sent out, the succeeding medium almost becomes sent out as well due to frictional force between the preceding medium and the succeeding medium. In the above state, when a front end of the succeeding medium is blocked by the separating roller and if the stiffness of the succeeding medium is low, the front end becomes flexed in the feeding direction at a portion upstream of a nip position between the separating roller and the feed roller, which may later become a cause of jamming.

SUMMARY

A medium feeding apparatus of the present disclosure that overcomes the issue includes a medium mount portion on which a plurality of mediums are mounted, a plurality of feed rollers that feed a bottom medium, among the plurality of mediums mounted on the medium mount portion, by coming in contact with the bottom medium and rotating, and a plurality of separating rollers that are provided at positions opposing the feed rollers and that separate the bottom medium from the plurality of mediums mounted on the medium mount portion. In the medium feeding apparatus, the plurality of feed rollers include a first feed roller, and a second feed roller that is provided so as to be spaced away from the first feed roller in a width direction that intersects a feeding direction of the mediums, the plurality of separating rollers include a first separating roller that opposes the first feed roller, and a second separating roller that opposes the second feed roller, the medium feeding apparatus includes a first curve forming portion that forms, in the mediums, a curve in the width direction, and the first curve forming portion is in contact with a medium at a portion upstream of a nip position between the feed rollers and the separating rollers in the feeding direction and at a portion between the first separating roller and the second separating roller in the width direction, and a state in which the portion in contact with the medium is, with respect to the outer circumferential surfaces of the feed rollers, positioned in a rotation center direction of the feed rollers is maintained.

BRIEF DESCRIPTION OF THE DRAWINGS

FIG. 14 is a flowchart illustrating a flow of a feeding operation.

DESCRIPTION OF EXEMPLARY EMBODIMENTS

Figure 1:
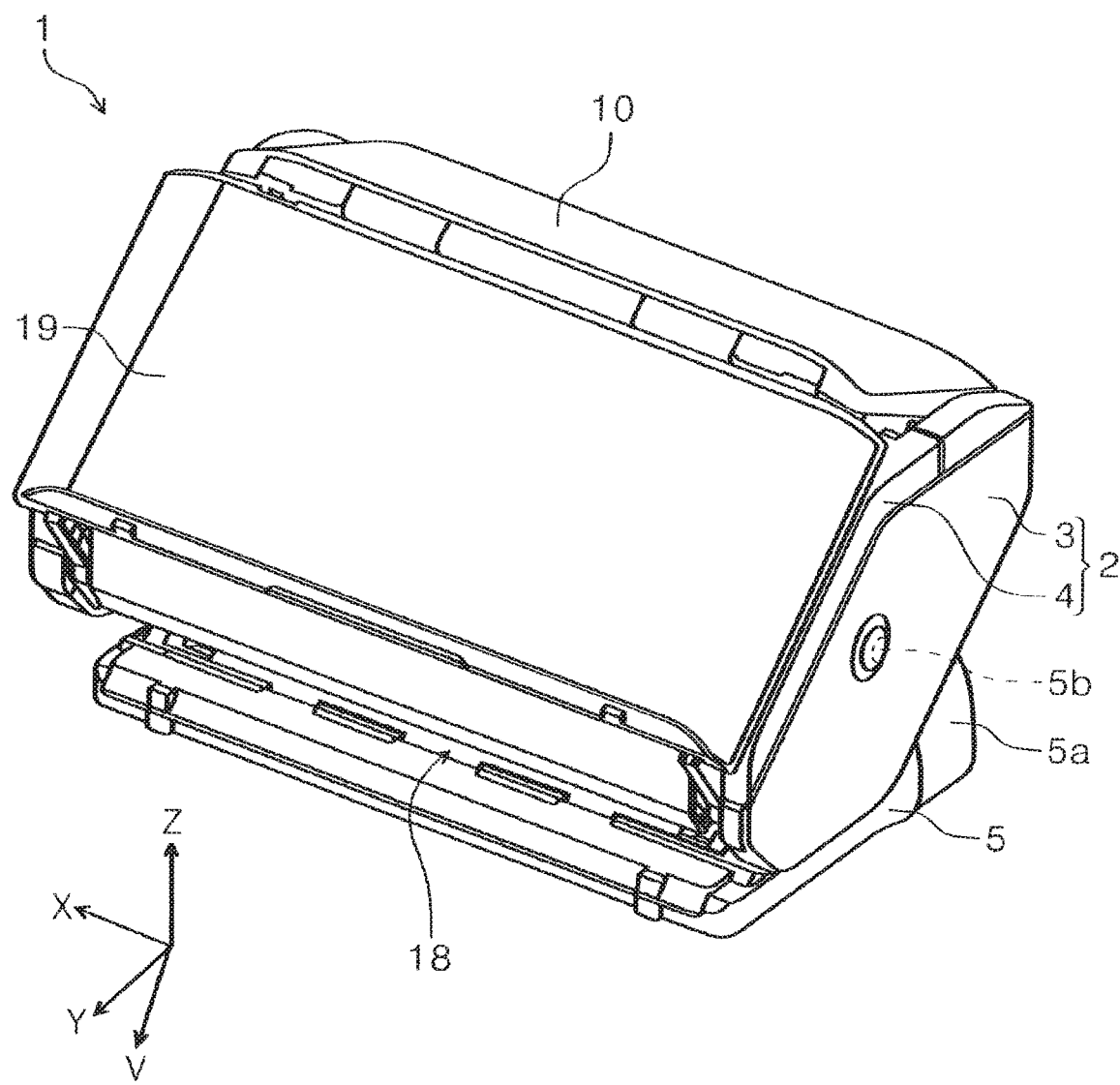
FIG. 1 is an external perspective view of a scanner, in which the apparatus body is in a second position, viewed from the front side.

Hereinafter, an outline of the present disclosure will be described.

A medium feeding apparatus according to a first aspect includes a medium mount portion on which a plurality of mediums are mounted, a plurality of feed rollers that feed a bottom medium, among the plurality of mediums mounted on the medium mount portion, by coming in contact with the bottom medium and rotating, and a plurality of separating rollers that are provided at positions opposing the feed rollers and that separate the bottom medium from the plurality of mediums mounted on the medium mount portion. In the medium feeding apparatus, the plurality of feed rollers include a first feed roller, and a second feed roller that is provided so as to be spaced away from the first feed roller in a width direction that intersects a feeding direction of the mediums, the plurality of separating rollers include a first separating roller that opposes the first feed roller, and a second separating roller that opposes the second feed roller, the medium feeding apparatus includes a first curve forming portion that forms, in the mediums, a curve in the width direction, and the first curve forming portion is in contact with a medium at a portion upstream of a nip position between the feed rollers and the separating rollers in the feeding direction and at a portion between the first separating roller and the second separating roller in the width direction, and a state in which the portion in contact with the medium is, with respect to the outer circumferential surfaces of the feed rollers, positioned in a rotation center direction of the feed rollers is maintained.

According to the present aspect, since the curve in the width direction is formed in the front end of the succeeding medium with the first curve forming portion, the stiffness of the front end in the feeding direction is improved. With the above, flexing of the front end of the succeeding medium in the transport direction at a portion upstream of the nip position between the separating rollers and the feed rollers is suppressed and, ultimately, jamming can be suppressed.

A second aspect according to the first aspect further includes a second curve forming portion and a third curve forming portion that form, in the mediums, curves in the width direction. In the second aspect, the second curve forming portion is in contact with a medium at a portion upstream of the nip position between the feed rollers and the separating rollers in the feeding direction and at a position spaced away from the first separating roller in a first direction that is one direction in the width direction, and a state in which the portion in contact with the medium is, with respect to the outer circumferential surfaces of the feed rollers, positioned in a rotation center direction of the feed rollers is maintained, and the third curve forming portion is in contact with a medium at a portion upstream of the nip position between the feed rollers and the separating rollers in the feeding direction and at a position spaced away from the second separating roller in a second direction that is opposite the first direction in the width direction, and a state in which the portion in contact with the medium is, with respect to the outer circumferential surfaces of the feed rollers, positioned in a rotation center direction of the feed rollers is maintained.

According to the present aspect, curves in the medium width direction can be formed in the front end of the succeeding medium in a more reliable manner with such second curve forming portion and third curve forming portion; accordingly, flexing of the front end of the succeeding medium in the feeding direction and at a portion upstream of the nip position between the separating rollers and the feed rollers can be suppressed in a more reliable manner and, ultimately, jamming can be suppressed in a more reliable manner.

In a third aspect according to the second aspect, the first curve forming portion, the second curve forming portion, and the third curve forming portion are configured to, with an operation of the user, become switched between a first state in which curves are formed in the mediums, and a second state in which the first curve forming portion, the second curve forming portion, and the third curve forming portion are positioned, with respect to the first state, in a direction retracted from a feeding path of the mediums.

According to the present aspect, since the first curve forming portion, the second curve forming portion, and the third curve forming portion are configured to, with the operation of the user, become switched between the first state in which the curves are formed in the mediums, and the second state in which the first curve forming portion, the second curve forming portion, and the third curve forming portion are positioned, with respect to the first state, in the direction retracted from the feeding path of the mediums, when feeding a thick medium with high stiffness, by setting to the second state, each curve forming portion can be suppressed from impeding the feeding of the medium.

A fourth aspect according to the second or third aspect further includes a fourth curve forming portion that is configured to advance into and retract from the feeding path of the mediums and that forms, in the mediums, a curve in the width direction by advancing into the feeding path. In the fourth aspect, the fourth curve forming portion is in contact with a medium at a position including the nip position between the feed rollers and the separating rollers in the feeding direction or at a portion that is downstream of the nip position and that is between the first separating roller and the second separating roller in the width direction.

According to the present aspect, since the curve in the width direction is formed in the medium with the fourth curve forming portion, the stiffness of the front end in the feeding direction is improved. With the above, the front end of the medium can reliably advance to a portion downstream of the nip position between the separating rollers and the feed rollers and, ultimately, jamming at a portion downstream of the nip position can be suppressed.

In a fifth aspect according to any one of the first to fourth aspects, a state in which torque of a motor is transmitted to the separating rollers in a first rotation direction that returns the mediums upstream in the feeding direction, and a state in which the torque of the motor is transmitted to the separating rollers in a second rotation direction that sends the mediums downstream in the feeding direction are switchable, and the torque of the motor in the first rotation direction is transmitted to the separating rollers during a feeding operation that sends out the mediums in contact with the feed rollers from the medium mount portion with the feed rollers, and a feeding preparing operation in which both the feed rollers and the separating rollers are rotated a predetermined amount in respective directions that send the mediums downstream in the feeding direction is performed before starting the feeding operation by transmitting, to the feed rollers, torque in a rotation direction that sends the mediums downstream in the feeding direction and by transmitting, to the separating rollers, torque in the second rotation direction.

According to the present aspect, with the feeding preparing operation, the front end of the succeeding medium that has been flexed in the feeding direction at a portion upstream of the nip position between the separating rollers and the feed rollers can be stretched, in other words, the flexure can be reduced or eliminated and, ultimately, jamming can be suppressed.

A sixth aspect includes a reading member that reads a medium, and the medium feeding apparatus according to any one of the first to fifth aspects that feeds the medium towards the reading member.

According to the present aspect, an advantageous effect of either one of the first to fifth aspects described above can be obtained in the image reading apparatus.

A seventh aspect includes a reading member that reads a medium, and the medium feeding apparatus according to the fifth aspect that feeds a medium towards the reading member. In the seventh aspect, an apparatus body including the reading member is supported by a support portion that comes in contact with a mount surface on which the apparatus is mounted, the apparatus body being provided so that a position thereof is changeable relative to the support portion, the apparatus body is configured to change between a first position that is a position taken when not in use, a second position that is a position taken when reading of an original is performed by the reading member, in which a projected area of the apparatus body on the mount surface is larger than that of the first position, and a third position that is a position taken when reading of an original is performed by the reading member, in which a projected area of the apparatus body on the mount surface is larger than that of the second position, when the apparatus body takes the second position, the feeding preparing operation is not performed, and when the apparatus body takes the third position, the feeding preparing operation is performed.

According to the present aspect, in addition to the advantageous effect of the fifth aspect, since the feeding preparing operation is performed when the apparatus body takes the third position, when the apparatus body takes the second position, a decrease in throughput due to performing the feeding preparing operation can be avoided by omitting the feeding preparing operation.

Hereinafter, the present disclosure will be described in detail.

Hereinafter, a scanner 1 configured to read at least one surface among a front surface and a back surface of an original will be exemplified as an example of the image reading apparatus. The scanner 1 is a so-called document scanner that preforms reading while moving an original relative to a reading member.

Note that in the X-Y-Z coordinate system depicted in each of the drawings, the X-axis direction is an apparatus width direction and is an original width direction. The Y-axis direction is an apparatus depth direction and is a direction extending in the horizontal direction. The Z-axis direction is a direction that extends in a vertical direction. Furthermore, the V-axis direction is a direction that is parallel to an original transport path T and the angle formed with the Y-axis direction in particular changes depending on the position of the apparatus.

In the present exemplary embodiment, the +Y direction is a direction extending from an apparatus rear surface towards an apparatus front surface, and the −Y direction is a direction extending from the apparatus front surface towards the apparatus rear surface. Furthermore, when viewed from the apparatus front surface, the left is the +X direction and the right is the −X direction.

Furthermore, hereinafter, a direction in which the original is transported (the +V direction) may be referred to as "downstream", and a direction opposite the above (the −V direction) may be referred to as "upstream".

Referring to FIGS. 1 to 4, the scanner 1 includes an apparatus body 2 and a support base 5 that rotatably supports the apparatus body 2.

The apparatus body 2 includes a lower unit 3 serving as a unit body, and an upper unit 4 serving as a second rotating body.

Figure 4:
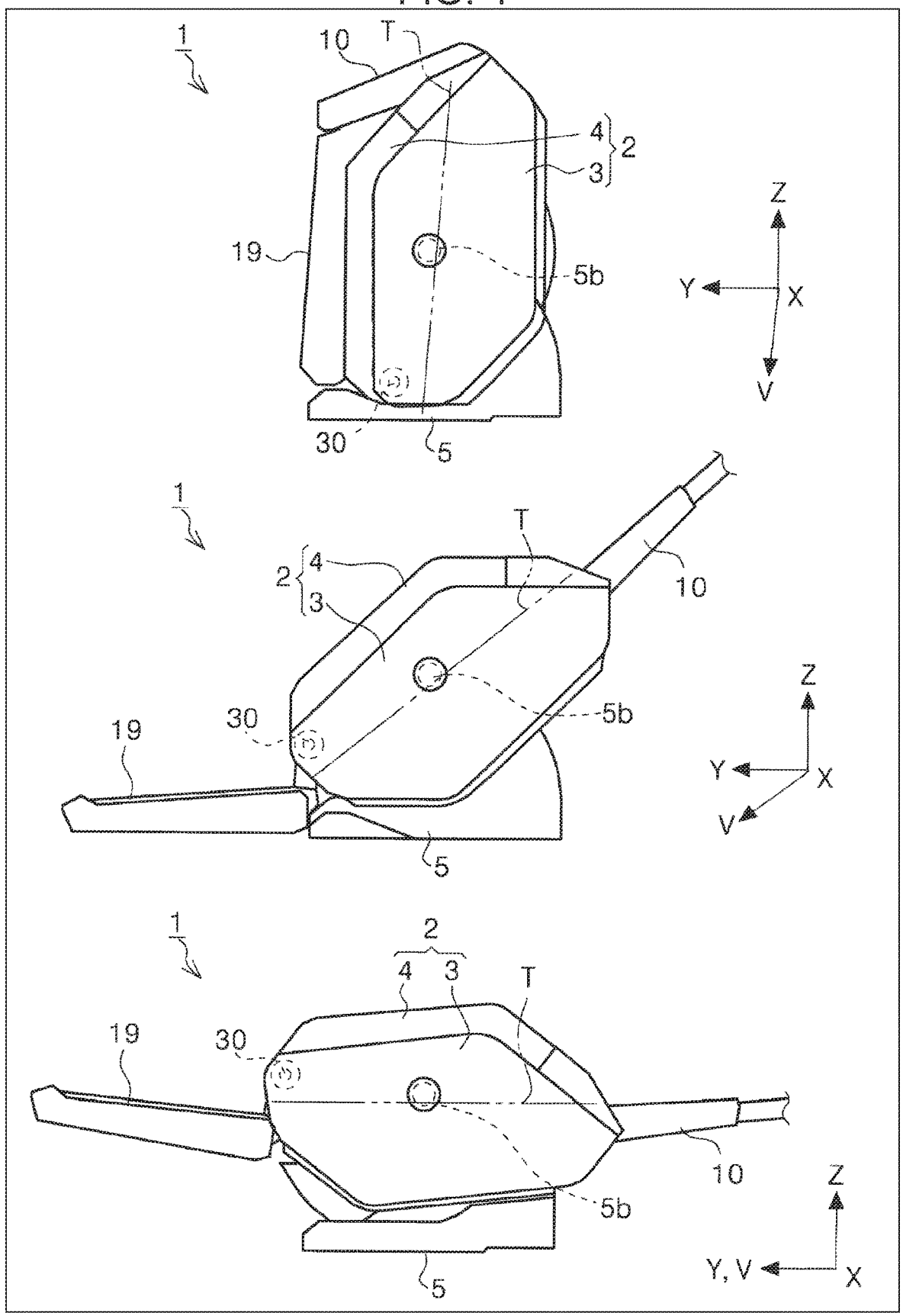
FIG. 4 illustrates variations in positions of the apparatus body

The upper unit 4 is provided so as to be opened/closed by rotating, relative to the lower unit 3, about a rotation shaft 30 (see FIG. 4). By being opened towards the apparatus front side, the upper unit 4 can expose an original transport path T described later.

The lower unit 3 that constitutes the apparatus body 2 is provided so as to be, relative to an arm portion 5a constituting the support base 5, rotatable about a rotation shaft 5b. The lower unit 3 is configured to change its position by rotation thereof.

The apparatus body 2 of the scanner 1 according to the present exemplary embodiment is configured to maintain three positions with a position maintaining member (not shown). Among the three positions, two positions are taken while reading an original, and the remaining one is taken while not in use. The position illustrated at the middle and the bottom of FIG. 4 are some of the positions taken while reading an original. The position illustrated at the middle is a second position and the position illustrated at the bottom is a third position. Furthermore, the position illustrated at the top of FIG. 4 is a position taken while not in use and is a first position. In the first position, the projected area of the scanner 1 on a mount surface becomes smallest. More specifically, in the first position, the apparatus body 2 takes a position in which the occupied space in the Y-axis direction is the smallest. In the second position, the projected area is larger than that of the first position, and in the third position, the projected area is larger than that of the second position.

Hereinafter, for convenience sake, the first position illustrated at the top in FIG. 4 is referred to as a "storage position", the second position illustrated at the middle in FIG. 4 is referred to as a "normal position", and the third position illustrated at the bottom in FIG. 4 is referred to as a "horizontal position".

The present exemplary embodiment is configured so that each position of the apparatus body 2 can be held by a holding member (not shown), and the state in which the position is maintained can be released with a release lever (not shown). Furthermore, the present exemplary embodiment is configured so that each position of the apparatus body 2 can be detected by a sensor (not shown).

The upper unit 4 includes a front cover 19 serving as a discharge tray, and the lower unit 3 includes an upper cover 10. The front cover 19 is provided so as to be, relative to the lower unit 3 and the upper unit 4, rotatable about the rotation shaft 30, and is capable of taking a closed state illustrated in FIG. 1 and an open state illustrated in FIG. 2 with the rotation thereof. By being opened, the front cover 19 functions as a discharge tray that receives an original on which reading has been performed and which has been discharged thereon.

Figure 2:
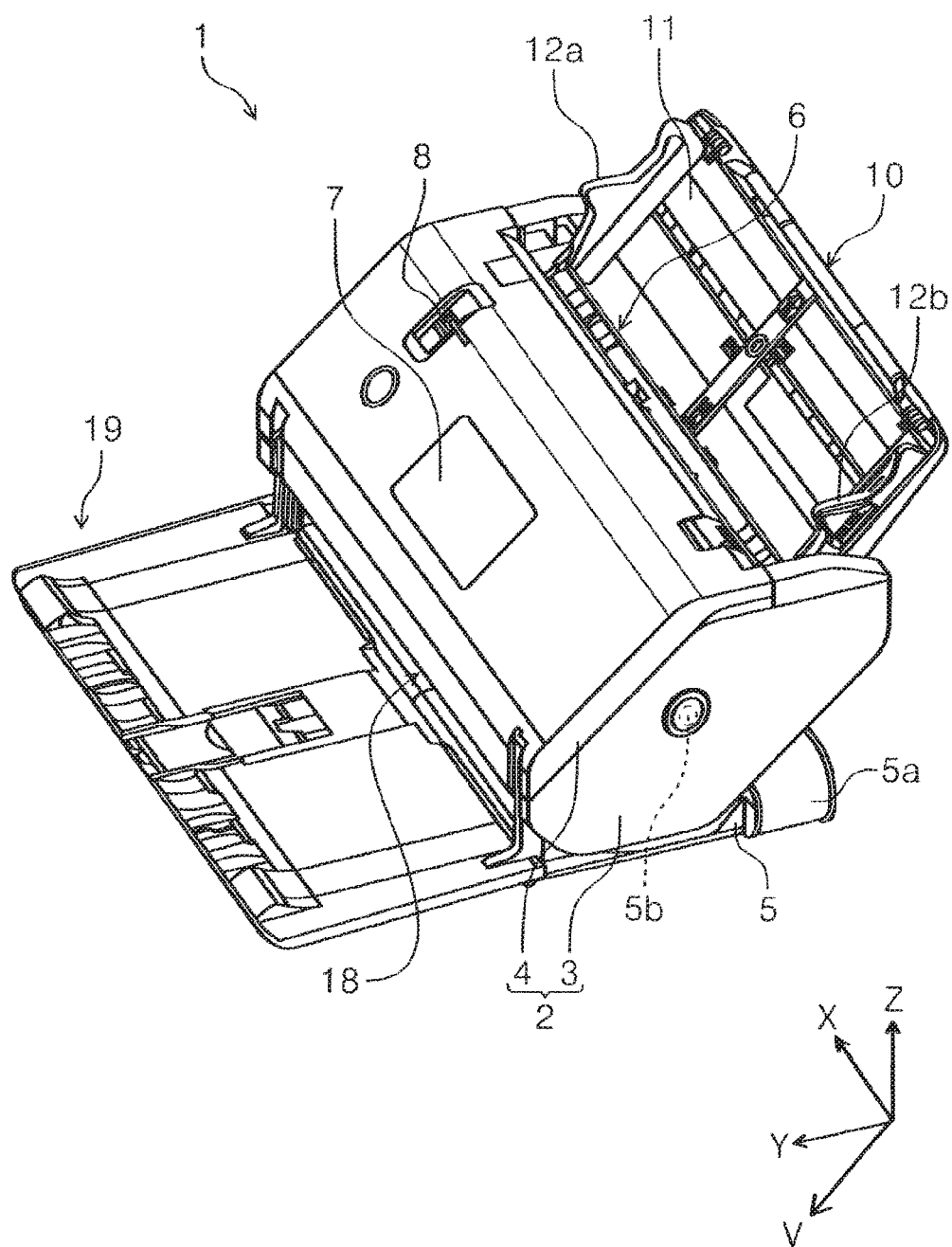
FIG. 2 is an external perspective view of the scanner, in which the apparatus body is in a second position and in which a front cover is open, viewed from the front side.

The upper unit 4 includes, as illustrated in FIG. 2, an operation panel 7 at an upper surface thereof. The operation panel 7 is implemented as a user interface (UI) in which various read settings and an execution of a reading operation are input and in which reading settings and the like are displayed. The operation panel 7 in the present exemplary embodiment is a so-called touch panel on which both display and input can be performed, and serves both as an operation portion for performing various operations and a display portion for displaying various pieces of information. The operation panel 7 is exposed by opening the front cover 19.

A switch lever 8 that switches the feeding conditions is provided in the upper unit 4. The switch lever 8 is configured to switch between a "normal position" that is a neutral position, a "soft separation position" that is a position inclined in a forward direction, or in the +Y direction, from the normal position, and a "non-separation position" that is a position inclined in an apparatus depth direction, or in the −Y direction, from the normal position. The differences in the feeding conditions in each of the positions will be described later.

Figure 3:
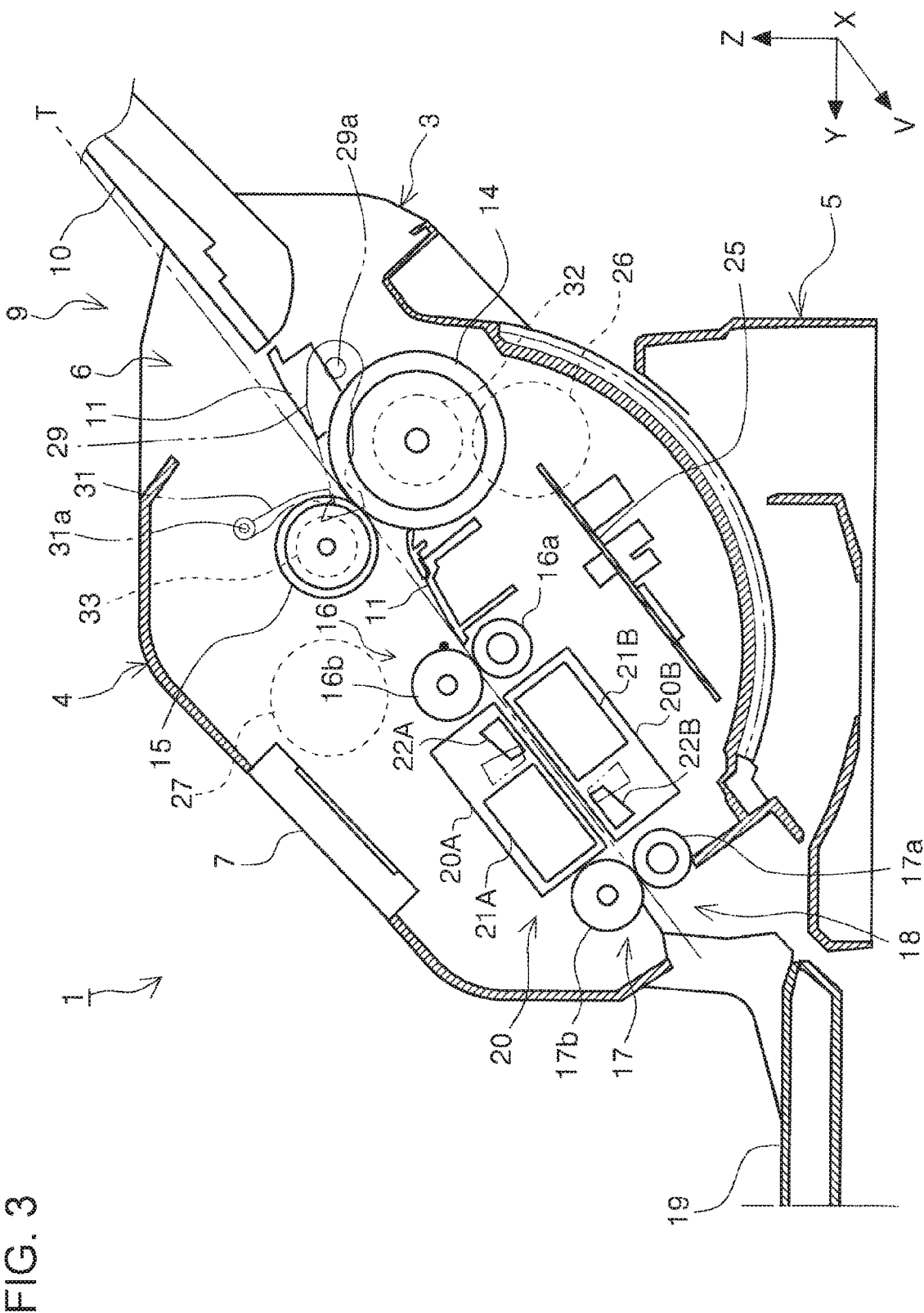
FIG. 3 is a cross-sectional view of an original transport path of the scanner viewed in a width direction, in which the apparatus body is in the second position.

The upper cover 10 provided on the lower unit 3 is provided rotatable relative to the lower unit 3 and, with the rotation thereof, is capable of taking a closed state as illustrated in FIG. 1 and an open state as illustrated in FIGS. 2 and 3. By being opened, the upper cover 10 functions as an original support tray that supports the fed original. In FIG. 2, reference numerals 12a and 12b are edge guides that guide the side edges of the original.

A feed port 6 continuous to the inside of the apparatus body 2 is provided on an upper portion of the apparatus body 2. The original mounted on the upper cover 10 is sent towards the inside of the apparatus body 2 through the feed port 6.

Referring mainly to FIG. 3, the original transport path in the scanner 1 will be described next.

The original transport path T is a substantially linear original transport path formed between the lower unit 3 and the upper unit 4.

When the apparatus body 2 takes the storage position (the drawing at the top in FIG. 4), the original transport path T is closest to vertical, when the apparatus body 2 takes the normal position (the drawing at the middle in FIG. 4), the original transport path T is at an inclination angle close to 45°, and when the apparatus body 2 takes the horizontal position (the drawing at the bottom in FIG. 4), the original transport path T is substantially horizontal.

The upper cover 10 described above is provided at a most upstream portion in the original transport path T, and feed rollers 14 that send the originals mounted on the upper cover 10 downstream and separating rollers 15 that nip and separate the originals with the feed rollers 14 are provided downstream of the upper cover 10. The separating rollers 15 are urged towards the feed rollers 14 with springs (not shown).

The feed rollers 14 come in contact with, among the originals mounted on the upper cover 10, the original at the bottom. Accordingly, when a plurality of originals are mounted on the upper cover 10, the originals are sequentially fed downstream from the original at the bottom.

The member depicted by reference numeral 31 is a flap. The flap 31 at a portion upstream of a first curve forming portion 45, a second curve forming portion 43A, and a third curve forming portion 43B that are described later (see FIG. 6) prevents the original set on the upper cover 10 from coming in contact with the separating roller 15 when in a feed standby state. The flap 31 is configured to rotate about a rotation shaft 31a, and before feeding is started, a lower end portion thereof is engaged with a set guide 29, which stops the rotation of the flap 3 in the clockwise direction in FIG. 3. When feeding is started, the set guide 29 is rotated in the clockwise direction in FIG. 3 about a rotation shaft 29a with a power source (not shown), which allows the flap 31 to rotate and a front end of the stack of originals mounted on the upper cover 10 to come in contact with the separating rollers 15.

Torque in a counterclockwise direction in FIG. 3, in other words, torque in a direction that sends the original downstream in the feeding direction is transmitted to the feed rollers 14 from a feed roller driving motor 26 through a one-way clutch 32. Hereinafter, a rotation direction of the feed rollers 14 when the feed rollers 14 send the original downstream is referred to as a normal direction, and a rotation direction opposite the normal direction is referred to as a reverse direction. Similarly, regarding the rotation direction of the feed roller driving motor 26 as well, a rotation direction sending the original downstream is referred to as a normal direction, and a direction opposite the normal direction is referred to as a reverse direction.

Since the one-way clutch 32 is provided in the driving force transmission path between the feed rollers 14 and the feed roller driving motor 26, even when the feed roller driving motor 26 was to rotate in a reverse manner, the feed rollers 14 do not rotate in a reverse manner. Furthermore, in a state in which the feed roller driving motor 26 is stopped, the feed rollers 14 in contact with the transported original can be driven and rotated in the normal direction.

Subsequently, rotational torque from a separating roller driving motor 27 is transmitted to the separating rollers 15 through a torque limiter 33. Torque in a first rotation direction (a counterclockwise direction in FIG. 3) that returns the original towards a portion upstream in the feeding direction or torque in a second rotation direction (a clockwise direction in FIG. 3) that sends the original towards a portion downstream in the feeding direction is transmitted to the separating rollers 15 from the separating roller driving motor 27.

Hereinafter, regarding the rotation direction of the separating rollers 15, the second rotation direction is referred to as a "normal direction", and the direction opposite the normal direction is referred to as a reverse direction.

Similarly, regarding the rotation direction of the separating roller driving motor 27 as well, a rotation direction when rotating the separating rollers 15 in the normal direction is referred to a normal direction, and a rotation direction that is opposite the normal direction is referred to as a reverse direction.

When no original is interposed between the feed rollers 14 and the separating rollers 15 or when there is a single piece of original interposed in between, the rotational torque of the feed rollers 14 rotating the separating rollers 15 in the normal direction exceeds an upper limit torque of the torque limiter 33, and owing to the sliding in the torque limiter 33, the separating rollers 15 are driven and rotated, in other words, the separating rollers 15 idle, regardless of the rotational torque from the separating roller driving motor 27.

During the original feeding operation, basically, the separating roller driving motor 27 is rotated in the reverse direction with the driving torque that rotates the separating rollers 15 in the reverse direction.

Furthermore, in addition to the original that is to be fed, when the second original or the second original and after enter between the feed rollers 14 and the separating rollers 15, since sliding occurs between the originals, the separating rollers 15 rotate in the reverse direction with the driving torque from the separating roller driving motor 27. With the above, the second original and after that were about to be multi fed are returned upstream, in other words, multi feeding is prevented.

Note that when outer circumferential surfaces of the feed rollers 14 and the separating rollers 15 are formed of an elastic material such as an elastomer, the frictional coefficient between the feed roller 14 and the separating roller 15 is $\mu1$, the frictional coefficient between the originals is $\mu2$, the frictional coefficient between the feed roller 14 and the original is $\mu3$, and the frictional coefficient between the separating roller 15 and the original is $\mu4$, a relationship $\mu1 > \mu2$ holds true. Furthermore, relationship $\mu1 > \mu3$, and relationship $\mu1 > \mu4$ hold true. Furthermore, relationship $\mu2 < \mu3$, and relationship $\mu2 < \mu4$ hold true. Furthermore, relationship $\mu4 > \mu3$ holds true.

The upper cover 10 described above is an example of a medium mount portion on which a medium, a representative example thereof is an original, is mounted. Furthermore, the upper cover 10, the feed rollers 14, and the separating rollers 15 constitute the original feeding apparatus 9 that feeds an original that is an example of a medium.

Furthermore, the original feeding apparatus 9 includes the first curve forming portion 45, the second curve forming portion 43A, the third curve forming portion 43B, and a fourth curve forming portion 42 illustrated in FIG. 8, which will be described later.

Furthermore, a pair of transport rollers 16, a reading portion 20 serving as the reading member that reads an image of an original, and a pair of discharge rollers 17 are provided downstream of the feed rollers 14. The pair of transport rollers 16 includes a transport driving roller 16a that is rotated and driven by a motor (not shown), and a transport driven roller 16b that is driven and rotated.

The original that is nipped between the feed rollers 14 and the separating rollers 15 and that is fed downstream is nipped between the pair of transport rollers 16 and is transported to a position opposing an upper sensor unit 20A and a lower sensor unit 20B located downstream of the pair of transport rollers 16.

The reading portion 20 includes the upper sensor unit 20A that is positioned above the original transport path T and that is provided in the upper unit 4, and the lower sensor unit 20B that is positioned below the original transport path T and that is provided in the lower unit 3. The upper sensor unit 20A includes a sensor module 21A, and the lower sensor unit 20B includes a sensor module 21B. In the present exemplary embodiment, the sensor modules 21A and 21B are contact image sensor modules (CISMs).

An upper surface of the original is read by the sensor module 21A positioned above the original transport path T, and an under surface of the original is read by the sensor module 21B positioned below the original transport path T.

Note that an original reading surface (not shown) read by the upper sensor unit 20A, and an original reading surface (not shown) read by the lower sensor unit 20B are surfaces parallel to the original transport path T.

The upper sensor unit 20A includes a background plate 22A at a position that opposes the sensor module 21B included in the lower sensor unit 20B, and the lower sensor unit 20B includes a background plate 22B at a position that opposes the sensor module 21A included in the upper sensor unit 20A.

The background plates 22A and 22B are reference plates that are read by opposing sensor modules to perform shading compensation and, for example, resin plates of a white color, a gray color, a black color, or the like or metal plates of a white color, a gray color, a black color, or the like can be used.

The background plates 22A and 22B are provided so as to be rotatable by motive power of a motor (not shown) and by rotating, the background plates 22A and 22B can switch between an opposing state illustrated by a solid line in which the background plates 22A and 22B oppose the sensor modules, and a non-opposing state illustrated by a two-dot chain line in which the opposing state is canceled. The background plates 22A and 22B are, for example, formed white. When in the opposing state, a white reference value can be obtained and when in the non-opposing state, a black reference value can be obtained.

After an image on at least one of the upper surface and the under surface of the original has been read in the reading portion 20, the original is nipped between the pair of discharge rollers 17 positioned downstream of the reading portion 20 and is discharged through a discharge port 18.

The pair of discharge rollers 17 include a discharge driving roller 17a rotated and driven by a motor (not shown), and a discharge driven roller 17b that is driven and rotated.

Referring next to FIGS. 5 to 10, a configuration that suppresses jamming of an original, which is provided around the feed rollers 14 and the separating rollers 15, will be described.

Figure 5:
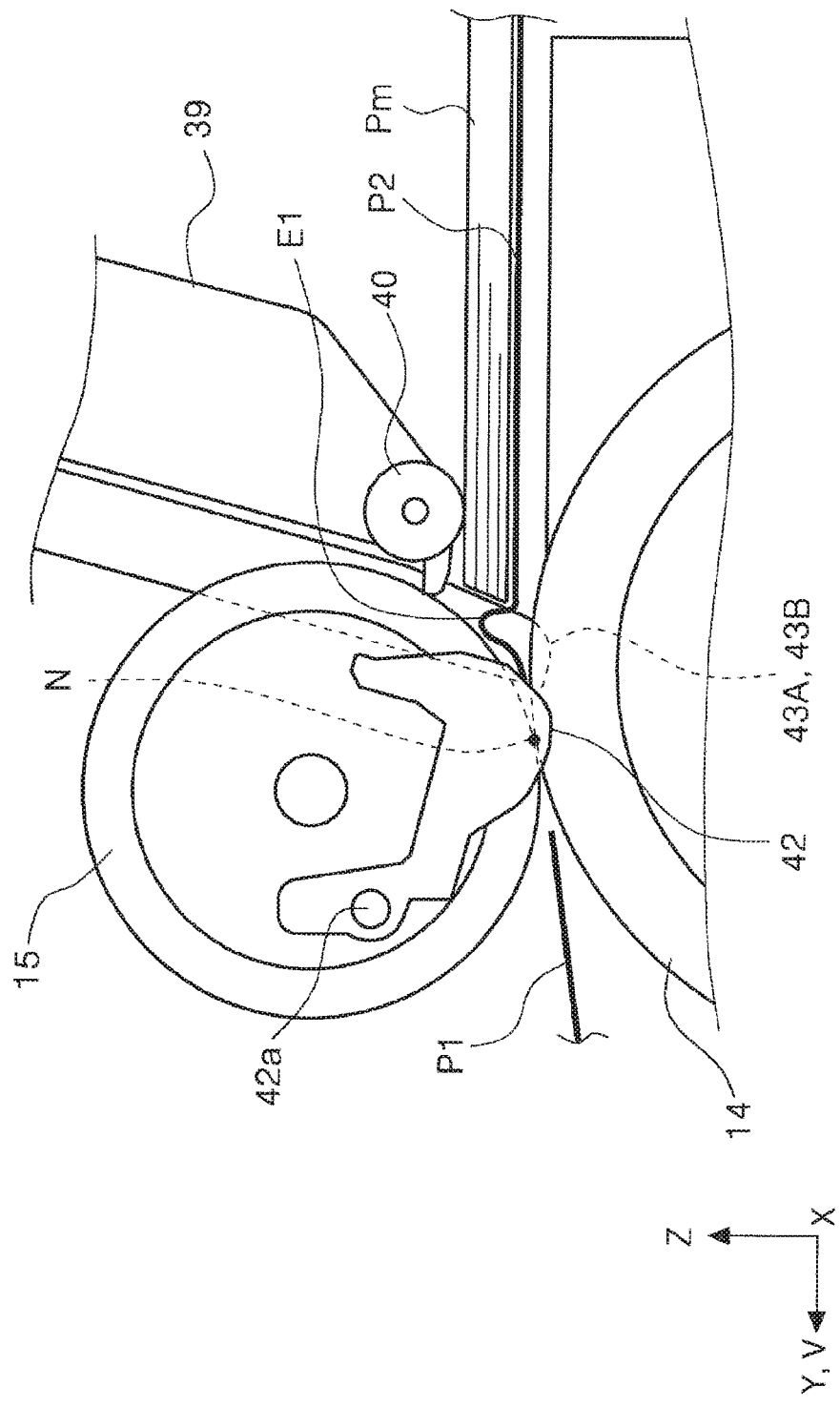
FIG. 5 is a sectional side view around a feed roller and a separating roller to illustrate an issue of a configuration that includes no first curve forming portion.

Referring first to FIG. 5, an issue in a configuration including no first curve forming portion 45 described later will be described.

In FIG. 5, reference numeral P1 is an original fed precedingly and, hereinafter, the original is referred to as a preceding original P1. Furthermore, reference numeral P2 is a succeeding original and the succeeding original is referred to as a succeeding original P2. Furthermore, reference numeral Pm is a stack of originals mounted on the succeeding original P2. Furthermore, FIG. 5 illustrates a state in which the apparatus body 2 has taken the horizontal position.

Note that in FIG. 5, reference numeral 39 is a pressing portion that presses down the stack of originals and reference numeral 40 is a driven roller provided in the pressing portion 39.

When the preceding original P1 is sent out, the succeeding original P2 is made to be sent out as well due to the frictional force between the preceding original P1 and the succeeding original P2. In the above, while a front end of the succeeding original P2 is blocked by the separating rollers 15, when the stiffness of the succeeding original P2 is low, as illustrated by reference numeral E1, the front end thereof may become flexed in the feeding direction at a portion upstream of a nip position N between the separating rollers 15 and the feed rollers 14, which may later on become a factor that causes jamming to occur. Furthermore, when a rear end of the preceding original P1 passes through the nip position N, the separating rollers 15 are reversed by a predetermined amount, and such reversal of the separating rollers 15 also forms the flexure E1.

Furthermore, the flexure E1 described above occurs more easily due to a space in which the front end of the succeeding original P2 can become flexed being formed upstream of the nip position N. The space is formed by the front end of the stack of originals Pm on the succeeding original P2 not reaching the separating rollers 15.

Such a phenomenon especially occurs when the frictional coefficient between the succeeding original P2 and the stack of originals Pm is low, and such a state occurs when, for example, the type of original, in other words, the material of the original is different between the succeeding original P2 and the stack of originals Pm.

In order to suppress such a flexure E1 of the front end of the succeeding original P2, a configuration that forms a curve in the width direction in the front end of the succeeding original P2 is provided in the present exemplary embodiment. In FIGS. 8 and 9, reference numeral 14A is a first feed roller, and reference numeral 14B is a second feed roller. In other words, a plurality of feed rollers 14 are provided in the present exemplary embodiment and the plurality of feed rollers 14 include the first feed roller 14A, and the second feed roller 14B that is provided so as to be spaced away from the first feed roller 14A in the original width direction.

Similarly, a plurality of separating rollers 15 are provided. The plurality of separating rollers 15 include a first separating roller 15A that opposes the first feed roller 14A, and a second separating roller 15B that opposes the second feed roller 14B.

Note that the straight line CL in FIG. 9 indicates the center position in the original width direction. When appropriately set on the upper cover 10 (see FIG. 2), the center position of any fed original of any size in the width direction coincides the center position CL. Furthermore, the first separating roller 15A and the second separating roller 15B are disposed at left-right symmetrical positions with respect to the center position CL, and the first feed roller 14A and the second feed roller 14B are disposed at left-right symmetrical positions with respect to the center position CL.

Furthermore, the first curve forming portion 45 and the fourth curve forming portion 42 described later are provided at positions along the center position CL, and the second curve forming portion 43A and the third curve forming portion 43B are disposed at left-right symmetrical positions with respect to the center position CL.

Figure 6:
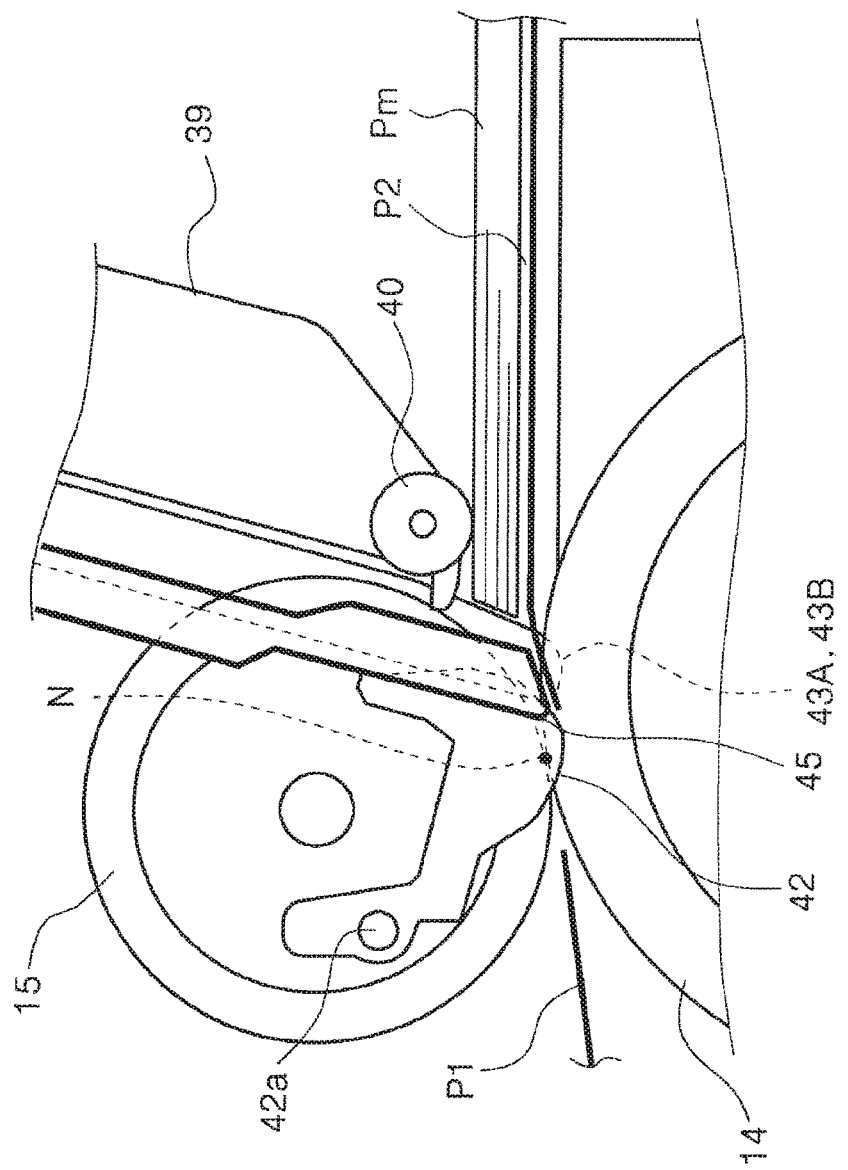
FIG. 6 is a VI-VI cross-sectional view of FIG. 9 and is a diagram of curve forming portions taking a first state.

Furthermore, the first curve forming portion 45 that forms, in the original, a curve extending in the original width direction is provided. As illustrated in FIG. 6, the first curve forming portion 45 comes in contact with the original at a portion upstream of the nip position N between the feed rollers 14 and the separating rollers 15 in the feeding direction and, as illustrated in FIGS. 8 and 9, at a portion between the first separating roller 15A and the second separating roller 15B in the original width direction.

Furthermore, as illustrated in FIGS. 6 and 9, the portion of the first curve forming portion 45 in contact with the original is, with respect to the outer circumferential surface of the feed roller 14, positioned in a rotation center direction of the feed roller 14 and is configured to maintain such a state. Note that in the present exemplary embodiment, when viewed in the original width direction, the amount at which the first curve forming portion 45 and the feed rollers 14 overlap each other is set to 0.25 mm to 0.75 mm.

With such a configuration, a curve extending in the original width direction, as illustrated in FIG. 9, is formed in the front end of the succeeding original P2, and the stiffness in the feeding direction is improved. With the above, flexing of the front end of the succeeding original P2 in the feeding direction at a portion upstream of the nip position N between the separating rollers 15 and the feed rollers 14 is suppressed and, ultimately, jamming can be suppressed.

Note that a surface of the first curve forming portion 45 upstream in the feeding direction is an inclined surface that is inclined obliquely downwards, and the lower end portion thereof is shaped so that the amount of overlap with the feed rollers 14 increases towards a downstream portion in the feeding direction. With the above, the front end of the original is less likely to get caught by the first curve forming portion 45.

Figure 8:
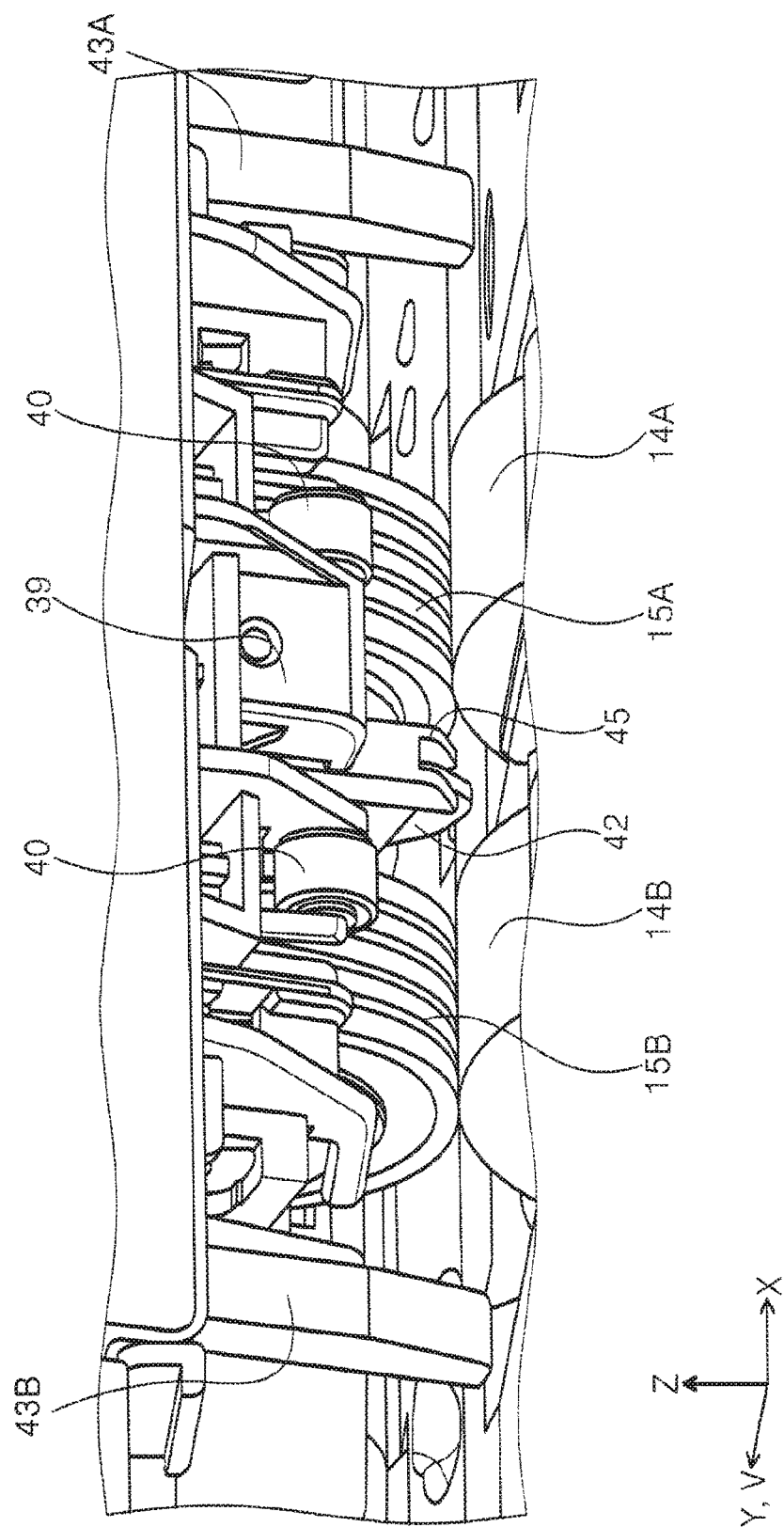
FIG. 8 is a perspective view around the feed rollers and the separating rollers.
Figure 9:
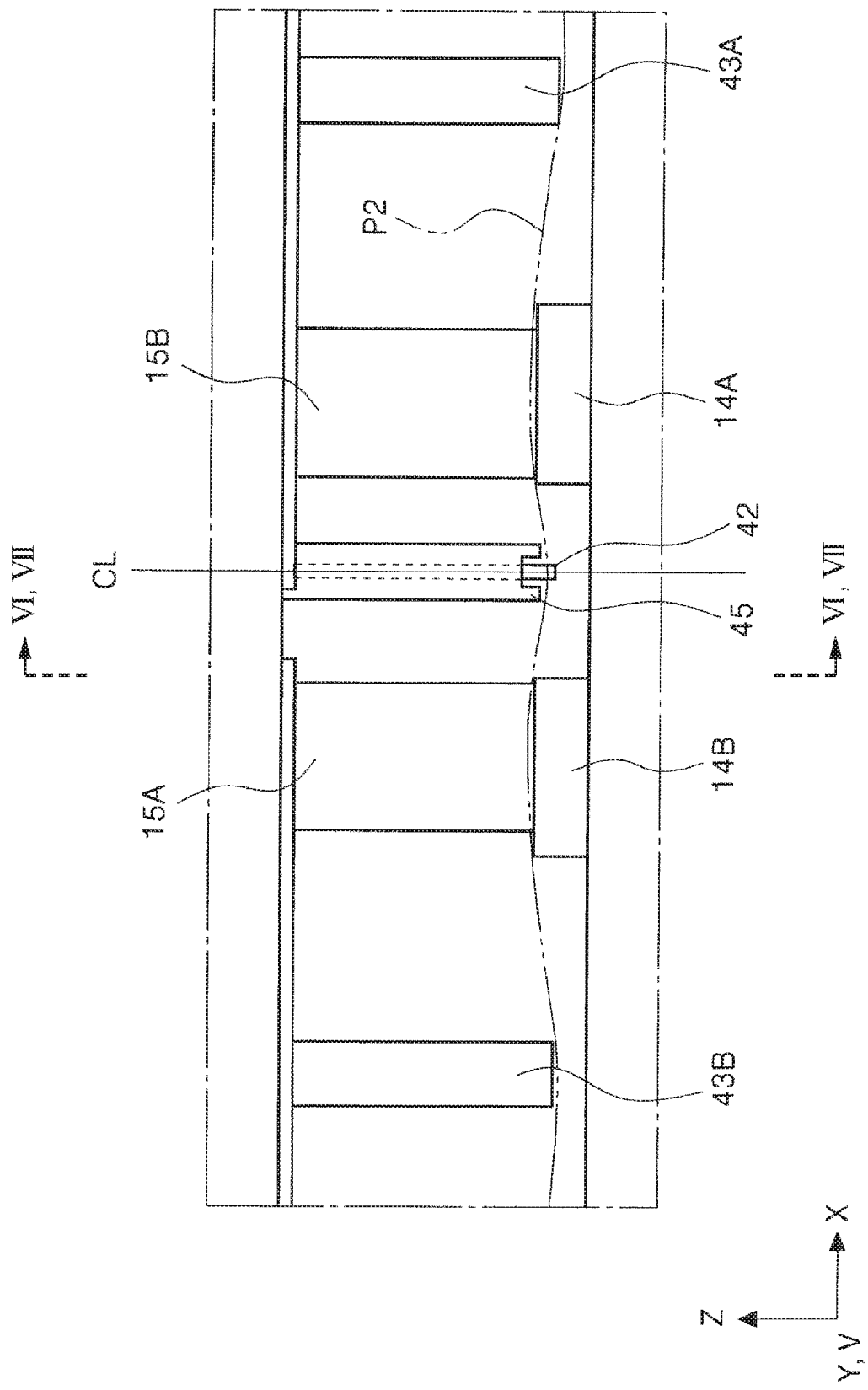
FIG. 9 is a front view around the feed rollers and the separating rollers.

Furthermore, as illustrated in FIGS. 8 and 9, in the present exemplary embodiment, the second curve forming portion 43A and the third curve forming portion 43b that each form, in the original, a curve extending in the original width direction are provided together with the first curve forming portion 45. The second curve forming portion 43A and the third curve forming portion 43B are members provided as a pair.

As illustrated in FIG. 6, the second curve forming portion 43A comes in contact with the original at a portion upstream of the nip position N between the feed rollers 14 and the separating rollers 15 in the feeding direction and, as illustrated in FIGS. 8 and 9, in the original width direction, at a portion separated from the first separating roller 15A in a first direction (the +X direction) that is one direction in the original width direction, and a state in which the portion in contact with the original is positioned in the rotation center direction of the feed roller 14 with respect to the outer circumferential surface of the feed roller 14 is maintained.

As illustrated in FIG. 6, the third curve forming portion 43B comes in contact with the original at a portion upstream of the nip position N between the feed rollers 14 and the separating rollers 15 in the feeding direction and, as illustrated in FIGS. 8 and 9, in the original width direction, at a position separated from the second separating roller 15B in a second direction (the −X direction) opposite the first direction (the +X direction), and a state in which the portion in contact with the original is positioned in the rotation center direction of the feed roller 14 with respect to the outer circumferential surface of the feed roller 14 is maintained.

Note that in the present exemplary embodiment, when viewed in the original width direction, the amount of overlap between the second curve forming portion 43A and the third curve forming portion 43B, and the feed rollers 14 is set to about 1.0 mm.

As illustrated in FIG. 9, curves in the original width direction can be formed in the front end of the succeeding original P2 in a more reliable manner with such second curve forming portion 43A and third curve forming portion 43B; accordingly, flexing of the front end of the succeeding original P2 in the feeding direction and at a portion upstream of the nip position between the separating rollers 15 and the feed rollers 14 can be suppressed in a more reliable manner and, ultimately, jamming can be suppressed in a more reliable manner.

Note that the present exemplary embodiment includes the fourth curve forming portion 42. The fourth curve forming portion 42 is provided so as to be pivotable about a pivot shaft 42a illustrated in FIG. 6 in a clockwise direction and in a counterclockwise direction in FIG. 6 and is pressed in the clockwise direction in FIG. 6 with a spring (not shown). The fourth curve forming portion 42 advances into and retracts from the original feeding path by pivoting. By advancing into the original feeding path, the fourth curve forming portion 42 forms, in the original, a curve extending in the original width direction. FIG. 6 illustrates a state in which the fourth curve forming portion 42 has advanced into the original feeding path.

In the present exemplary embodiment, the fourth curve forming portion 42 is situated at a position in the original feeding direction that includes the nip position N between the feed rollers 14 and the separating rollers 15 and, as illustrated in FIGS. 8 and 9, is in contact with the original at a portion between the first separating roller 15A and the second separating roller 15B in the original width direction. Note that in the present exemplary embodiment, when viewed in the original width direction, the amount at which the fourth curve forming portion 42 and the feed rollers 14 overlap each other is set to about 1.0 mm. Furthermore, in a portion of the fourth curve forming portion 42 in contact with the medium, a portion overlaps the nip position N in the feeding direction.

By having a curve extending in the original width direction be formed in the original with such a fourth curve forming portion 42, the stiffness in the original feeding direction is improved and, in particular, the front end of the original can advance downstream with respect to the nip position N between the separating rollers 15 and the feed rollers 14 in a reliable manner and, ultimately, jamming at a portion downstream of the nip position N can be suppressed.

Note that as illustrated in FIG. 6, the lower end portions of the first curve forming portion 45 and the fourth curve forming portion 42 are, when viewed in the original width direction, formed so as to be connected in a smooth manner so that a large unevenness is not formed in the feeding path in the feeding direction. Furthermore, in the present exemplary embodiment, as illustrated in FIG. 9, a width of the fourth curve forming portion 42 in the original width direction is smaller than a width of the first curve forming portion 45; however, the width of the fourth curve forming portion 42 may be formed larger than the width of the first curve forming portion 45.

Note that the first curve forming portion 45, the second curve forming portion 43A, and the third curve forming portion 43B are configured to, by an operation of the user, switch between a first state in which the curves are formed in the original, and a second state positioned at a position retracted from the original feeding path with respect to the first state. The switching of the above states is performed by the user operating the switch lever 8 that has been described while referring to FIG. 2. Note that hereinafter, when there is no need in particular to distinguish between the first curve forming portion 45, the second curve forming portion 43A, and the third curve forming portion 43B, the above will be referred to as "each curve forming portion".

When the switch lever 8 is in the "normal position" and in the "non-separation position", each curve forming portion is in a second state, and when in the "soft separation position", each curve forming portion is in the first state.

The soft separation position described above is recommended to be used when the apparatus body 2 is in the horizontal position. Note that the non-separation position described above is recommended to be used when the apparatus body 2 is in the normal position and the transported originals are booklet shaped.

When the switch lever 8 is switched to the soft separation position, the pressing force of a spring (not shown) that presses the separating rollers 15 towards the feed rollers 14 is, with a control mechanism (not shown), set smaller than that when in the normal position. Furthermore, when the switch lever 8 is switched to the non-separation position, a state in which the driving force from the separating roller driving motor 27 is not transmitted to the separating rollers 15 is reached with a switching mechanism (not shown).

Furthermore, with the operation of the user described above, switching between the first state in which each curve forming portion forms a curve in the original, and a second state in which each curve forming portion is positioned, with respect to the first state, in a direction retracted from the original feeding path can be performed; accordingly, when a thick original with high stiffness is fed, each curve forming portion can be suppressed from impeding the feeding of the original by turning each curve forming portion to the second state.

Figure 7:
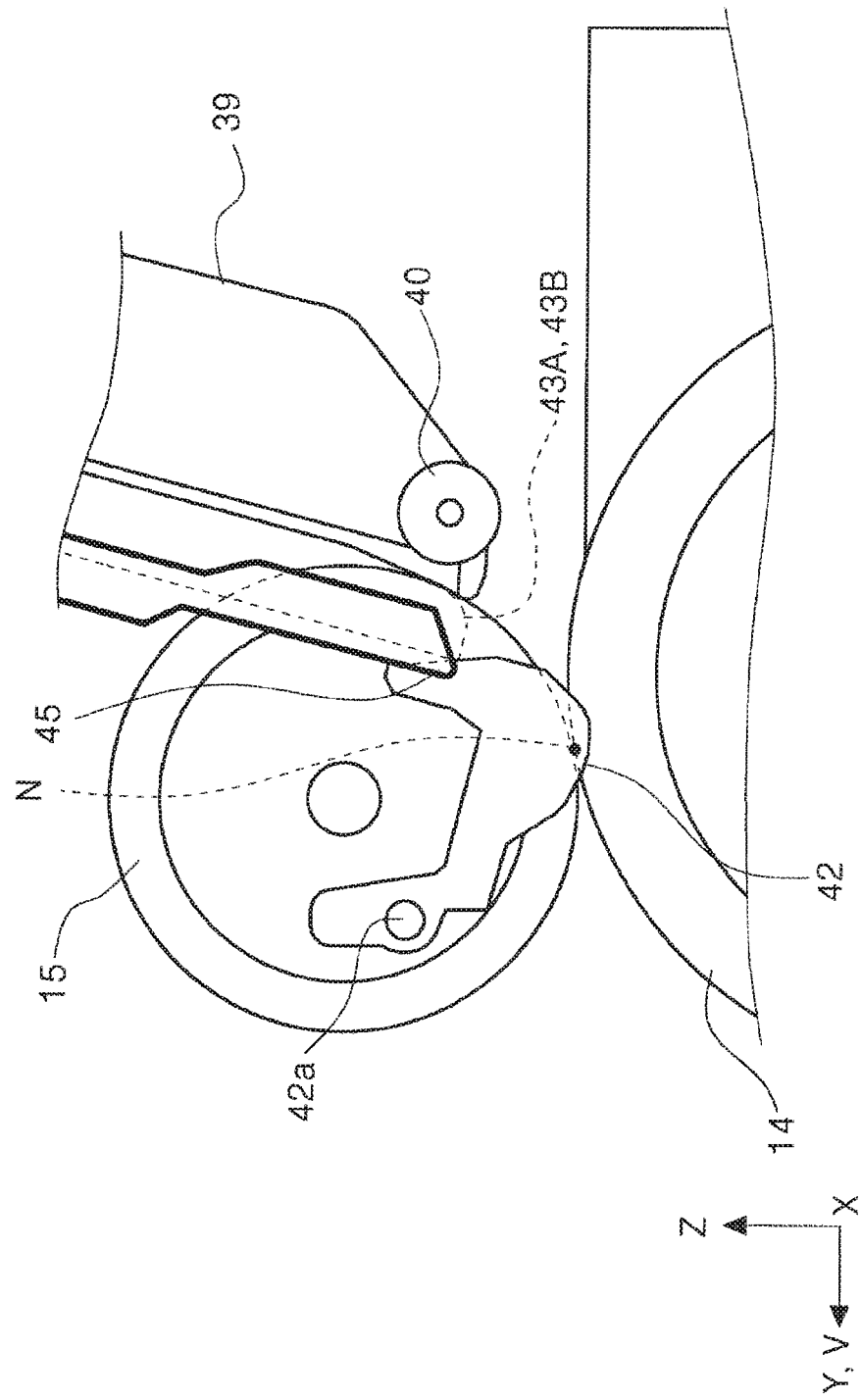
FIG. 7 is a VII-VII cross-sectional view of FIG. 9 and is a diagram of each curve forming portion taking a second state.

FIG. 6 illustrates a state in which each curve forming portion is in the first state, and FIG. 7 illustrates a state in which each curve forming portion is in the second state. Furthermore, FIGS. 8 and 9 illustrates a state in which each curve forming portion is in the first state.

Note that since the fourth curve forming portion 42 can advance into and retract from the original feeding path, when a thick original with high stiffness is fed, the fourth curve forming portion 42 can retract from the original feeding path by being pivoted.

Note that in the present exemplary embodiment, the switch lever 8 (FIG. 2) and each curve forming portion are engaged with each other through a link mechanism (not shown), in other words, the switching of the states of each curve forming portion is performed by the operation force of the user without using a power source; however, a power source such as, for example, a solenoid or a motor may be used and the power source may displace each curve forming portion according to the operation of the switch lever 8. Furthermore, in such a configuration, when the position of the apparatus body 2 is switched to the third position, switching to the feeding condition in the soft separation position described above may be automatically performed.

Furthermore, in the exemplary embodiment described above, each curve forming portion is provided in a fixed manner so as not to become displaced upwards with the force from the original when in at least the first state; however, each curve forming portion may be provided so as not to become displaced upwards by at least the force from the original by pressing each curve forming portion towards the first state with a spring with a large spring force, for example.

Figure 10:
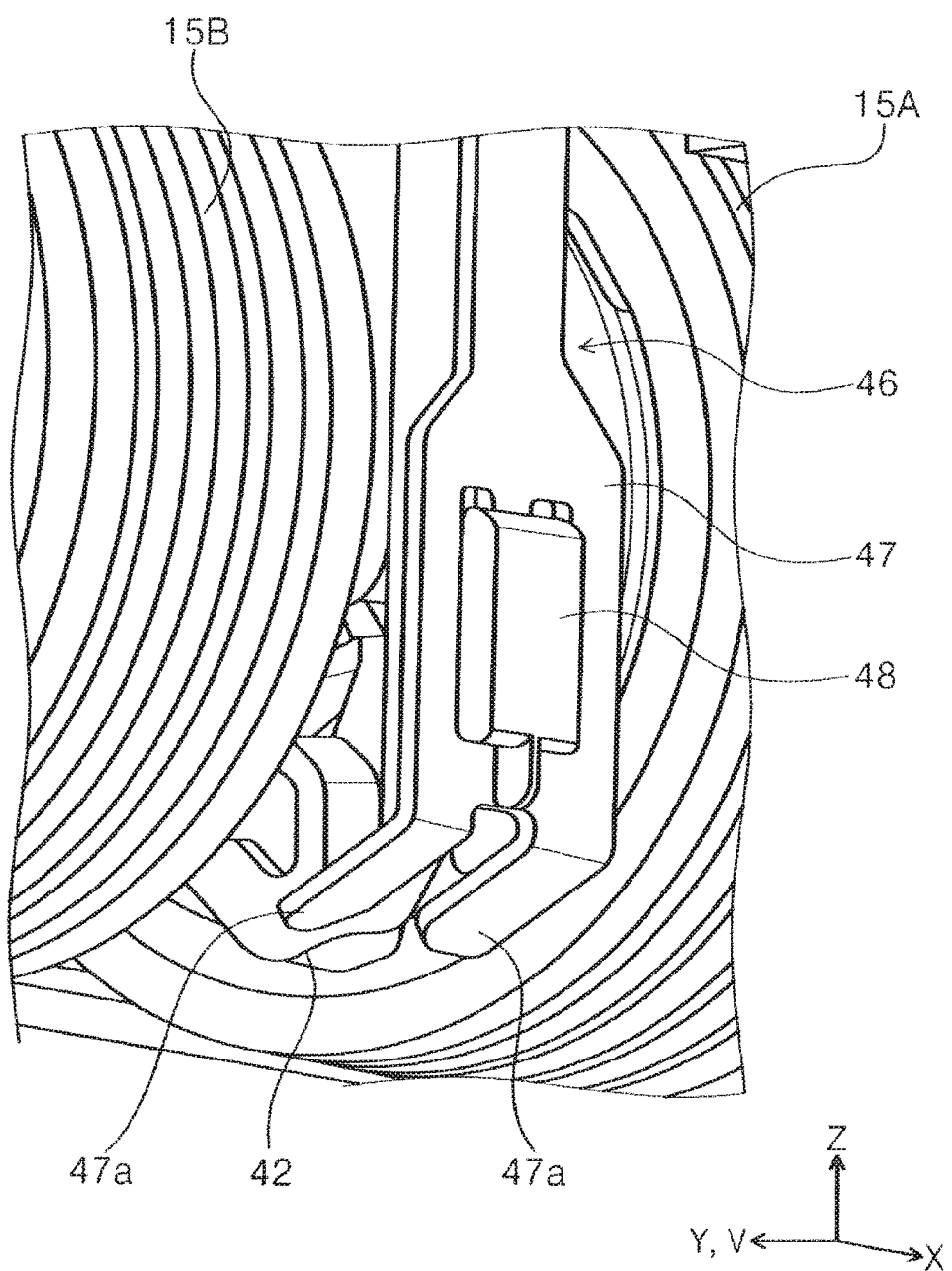
FIG. 10 is a perspective view illustrating another exemplary embodiment of the first curve forming portion.

The first curve forming portion 45 described above may be configured in a manner illustrated in FIG. 10. A first curve forming portion 46 illustrated in FIG. 10 includes an attaching portion 48 and an elastic plate 47, in other words, the first curve forming portion 46 is constituted by a plurality of members. A front end portion 47a of the elastic plate 47 is bent so as to be oriented downstream in the feeding direction, and is configured to become elastically deformed by coming in contact with the original.

By having the portion in the first curve forming portion 46 that comes in contact with the original be elastically deformable, the original can be fed appropriately without the first curve forming portion 46 applying an excessive feed load to the original even when the thickness of the original is large. Furthermore, while the portion of the first curve forming portion 46 in contact with the original becomes worn out easily, the elastic plate 47 constituting the portion in contact with the original can be detached from the attaching portion 48 and the worn out portion can be replaced easily.

Note that while the elastic plate 47 in the present exemplary embodiment is formed of a metal plate material, the elastic plate can be formed of a resin sheet material or the like.

While the configurations described above suppress the flexure E1, which is formed at the front end of the succeeding original P2 (see FIG. 5), with each curve forming portion, the flexure E1 that has occurred can be reduced or eliminated with the control described below.

In other words, since, in some cases, the flexure E1 occurs by reverse rotation of the separating rollers 15, the flexure E1 can be reduced or eliminated if the separating rollers 15 are rotated by a predetermined amount before the succeeding original P2 is fed. Such an operation is referred to hereinafter as a feeding preparing operation.

FIG. 14 illustrates an example of such control. In FIG. 14, when feeding of the original is started (Yes in step S101), determination is made on whether the apparatus body 2 is in the third position (step S102), and when apparatus body 2 is in the third position (Yes in step S102), the feeding preparing operation described above is performed (step S103). The technical issue described while referring to FIG. 5, in other words, the occurrence of the flexure E1 is due to the flexure E1 easily occurring when the apparatus body 2 takes the third position.

The feeding preparing operation (step S103) is an operation of rotating the feed rollers 14 and the separating rollers 15 in the normal direction by a small amount. Note that the small amount is an amount that can reduce or eliminate the flexure E1 illustrated in FIG. 5 and is an amount in which the multi fed original does not enter between the feed rollers 14 and the separating rollers 15 or even when the original enters therebetween, the amount is negligible.

Note that the speed at which the feed rollers 14 and the separating rollers 15 send the original in the feeding preparing operation (step S103) is, desirably, slower than the speed at which the feed rollers 14 send the original in the feeding operation (step S104).

Furthermore, the timing at which the driving of the feed rollers 14 and the timing at which the driving of the separating rollers 15 are started in the feeding preparing operation are, desirably, the same or, at least, the timing at which the driving of the separating rollers 15 is started is faster than the timing at which the driving of the feed rollers 14 is started. The above is because, when the feed rollers 14 rotate in the normal direction antecedently, the flexure E1 (see FIG. 5) becomes larger or jamming owing to the flexure E1 occurs.

Subsequently, the feeding operation (step S104) is performed after the feeding preparing operation (step S103). The feeding operation (step S104) is performed by rotating the feed rollers 14 in the normal direction and rotating the separating rollers 15 in the reverse direction. Note that when the position of the apparatus body 2 is a position other than the third position (No in step S102), the feeding preparing operation (step S103) is omitted and the process moves on to the feeding operation (step S104).

Subsequently, when feeding of the original has been ended (Yes in step S105), the driving of the feed rollers 14 and the separating rollers 15 is stopped (step S106). Note that in the present exemplary embodiment, the feeding of the original being ended is when the front end of the original reaches the pair of transport rollers 16. The front end of the original reaching the pair of transport rollers 16 can be detected by a sensor (not shown) located in the original feeding path between the pair of transport rollers 16 and the reading portion 20.

With the feeding preparing operation (step S104) described above, the front end of the succeeding original P2 that has been flexed in the feeding direction at a portion upstream of the nip position N between the separating rollers 15 and the feed rollers 14 can be stretched, in other words, the flexure E1 (see FIG. 5) can be reduced or eliminated and, ultimately, jamming can be suppressed.

Furthermore, in the present exemplary embodiment, the feeding preparing operation is performed when the apparatus body 2 takes the horizontal position, and when the normal position is taken, the feeding preparing operation is not performed; accordingly, a decrease in the throughput due to performing the feeding preparing operation can be avoided.

Other characteristics of the scanner 1 according to the present exemplary embodiment will be described next.

Figure 11:
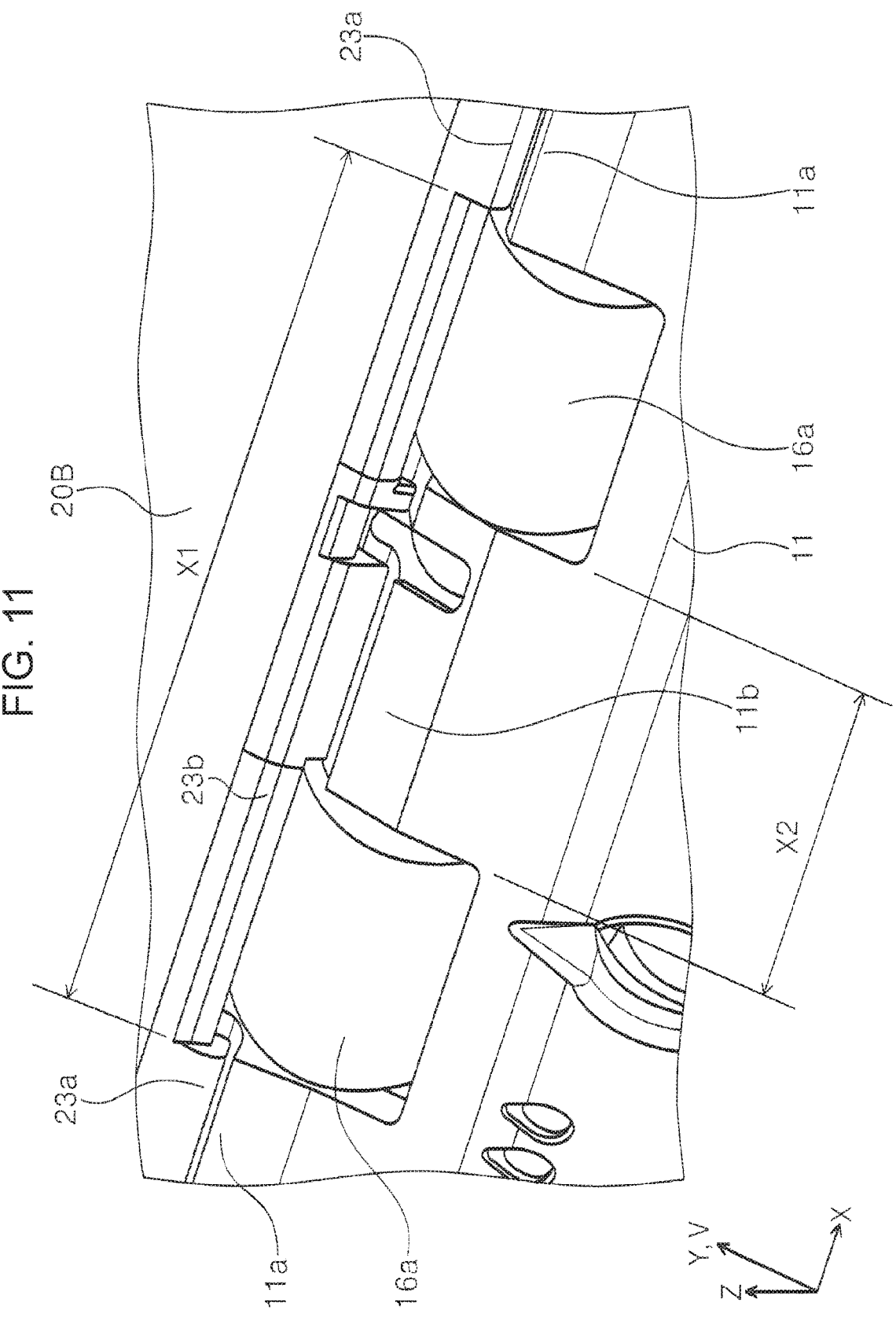
FIG. 11 is a perspective view around a pair of transport rollers.

FIG. 11 is a perspective view near the transport driving rollers 16a and reference numeral 11 is an original guiding member included in the lower unit 3. The original is delivered from the original guiding member 11 to a housing 23 that constitutes the lower sensor unit 20B.

Reference numeral 11a is a first upstream coupling portion of the original guiding member 11 and is coupled to the housing 23, and reference numeral 11b is a second upstream coupling portion of the original guiding member 11 and is coupled to the housing 23. Furthermore, reference numeral 23a is a first downstream coupling portion of the housing 23 and is coupled to the first upstream coupling portion 11a, and reference numeral 23b is a second downstream coupling portion of the housing 23 and is coupled to the second upstream coupling portion 11b.

The second upstream coupling portion 11b is formed in an area X2 between two transport driving rollers 16a, and the first upstream coupling portions 11a is formed in areas outside of the two transport driving rollers 16a. Furthermore, the second downstream coupling portion 23b is formed in an area X1 including the two transport driving rollers 16a, and the first downstream coupling portions 23a are formed in areas outside the two transport driving rollers 16a.

Figure 12:
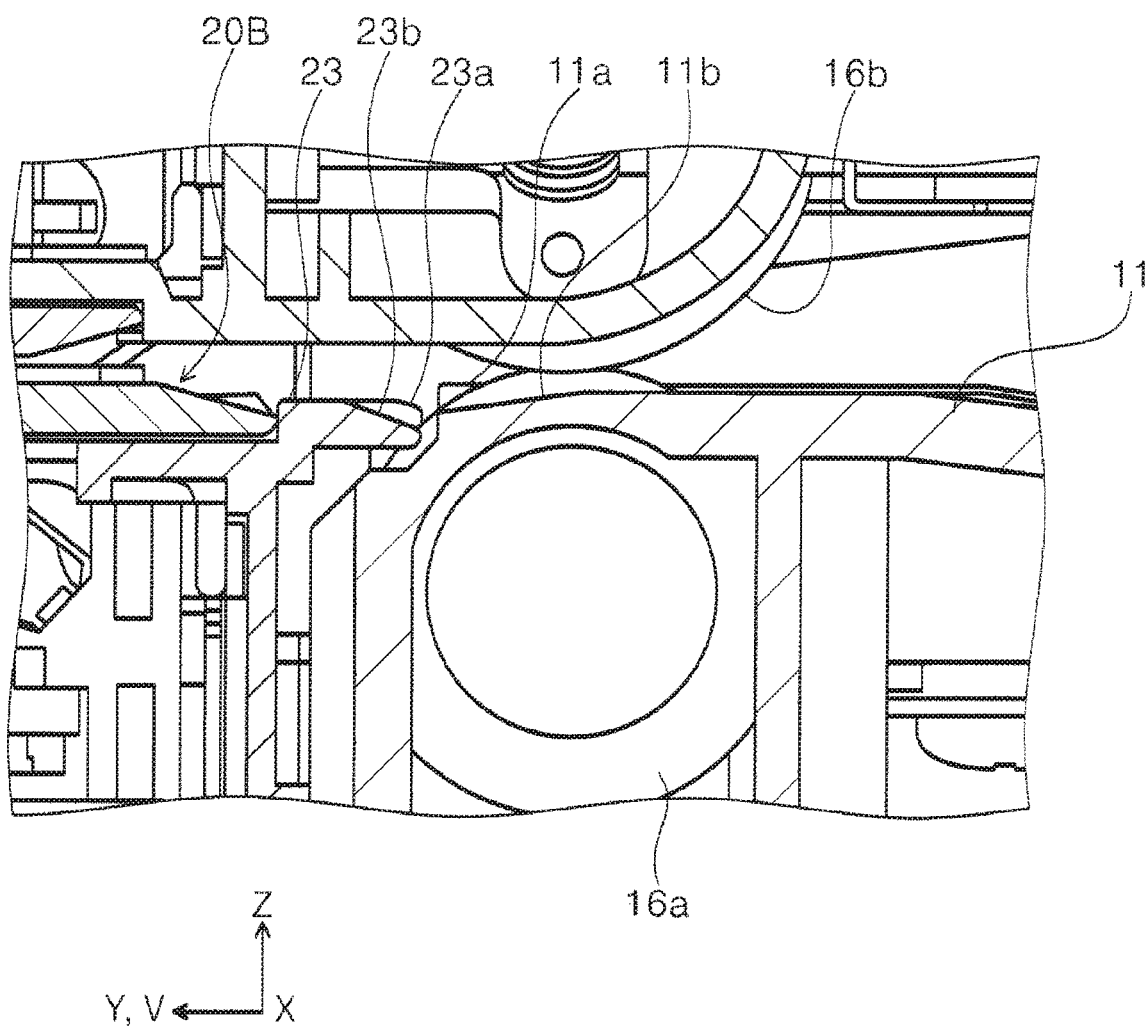
FIG. 12 is a cross-sectional view around the pair of transport rollers.

Note that as illustrated in FIG. 12, the second upstream coupling portion 11b forms a cut away shape with respect to the first upstream coupling portion 11a, in other words, the second upstream coupling portion 11b is formed with a shape recessed in the −Z direction. Similarly, the second downstream coupling portion 23b forms a cut away shape with respect to the first downstream coupling portions 23a, in other words, the second downstream coupling portion 23b is formed with a shape recessed in the −Z direction.

With such shapes, when transporting a card on which embossed characters are formed, skewing of the card due to the embossed characters being caught can be suppressed.

Figure 13:
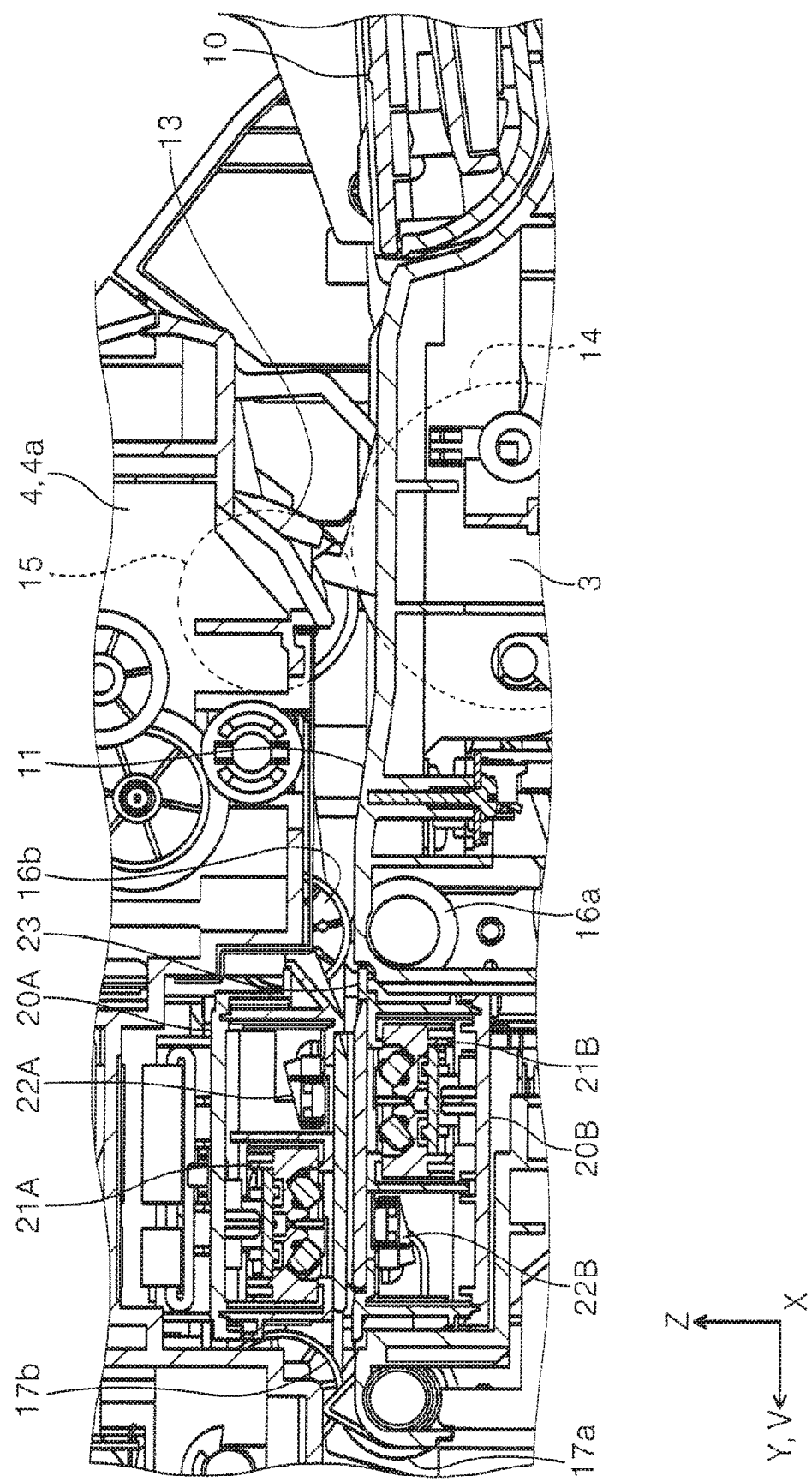
FIG. 13 is a cross-sectional view of the original transport path of the scanner viewed in the width direction, in which the apparatus body is in the third position.

Furthermore, as illustrated in FIG. 13, entering height restricting portions 13 that restrict the mounted height of the originals entering between the separating rollers 15 and the feed rollers 14 are provided in a frame 4a constituting the upper unit 4. The entering height restricting portions 13 are disposed at left-right symmetrical positions with respect to the center position CL (see FIG. 5) in the original width direction. The entering height restricting portions 13 suppress curling of an original such as, for example, a slip in which curling easily occurs in the edge area in the original width direction. When there is curling in the edge area of the original in the original width direction and when the curl enters the apparatus in that state, skewing may occur; however, by suppressing the curling in the edge area in the original width direction in the manner described above, the above skewing can be suppressed.

The present disclosure is not limited to the exemplary embodiments described above and various modifications can be made within the scope of the disclosure stated in the claims, which are, naturally, also included in the scope of the present disclosure.

What is claimed is:

1. A medium feeding apparatus comprising:
   a medium mount portion on which a plurality of mediums are mounted;
   a plurality of feed rollers that feed a bottom medium, among the plurality of mediums mounted on the medium mount portion, by coming in contact with the bottom medium and rotating; and
   a plurality of separating rollers that are provided at positions opposing the feed rollers and that separate the bottom medium from the plurality of mediums mounted on the medium mount portion, wherein
   the plurality of feed rollers include a first feed roller, and a second feed roller that is provided so as to be spaced away from the first feed roller in a width direction that intersects a feeding direction of the mediums,
   the plurality of separating rollers include a first separating roller that opposes the first feed roller, and a second separating roller that opposes the second feed roller,
   the medium feeding apparatus includes a first curve forming portion that forms, in the mediums, a curve in the width direction, and
   the first curve forming portion is in contact with a medium at a portion upstream of a nip position between the feed rollers and the separating rollers in the feeding direction and at a portion between the first separating roller and the second separating roller in the width direction, and a state in which the first curve forming portion is in contact with the medium at a portion between outer circumferential surfaces of the feed rollers and rotation centers of the feed rollers is maintained.

2. The medium feeding apparatus according to claim 1, further comprising:
a second curve forming portion and a third curve forming portion that form, in the mediums, curves in the width direction, wherein
the second curve forming portion is in contact with a medium at a portion upstream of the nip position between the feed rollers and the separating rollers in the feeding direction and at a position spaced away from the first separating roller in a first direction that is one direction in the width direction, and a state in which the portion in contact with the medium is, with respect to the outer circumferential surfaces of the feed rollers, positioned in a rotation center direction of the feed rollers is maintained, and
the third curve forming portion is in contact with a medium at a portion upstream of the nip position between the feed rollers and the separating rollers in the feeding direction and at a position spaced away from the second separating roller in a second direction that is opposite the first direction in the width direction, and a state in which the third curve forming portion is in contact with the medium at a portion between the outer circumferential surfaces of the feed rollers and the rotation centers of the feed rollers is maintained.

3. The medium feeding apparatus according to claim 2, wherein
the first curve forming portion, the second curve forming portion, and the third curve forming portion are configured to, with an operation of the user, become switched between a first state in which curves are formed in the mediums, and a second state in which the first curve forming portion, the second curve forming portion, and the third curve forming portion are positioned, with respect to the first state, in a direction retracted from a feeding path of the mediums.

4. The medium feeding apparatus according to claim 2, further comprising:
a fourth curve forming portion that is configured to advance into and retract from the feeding path of the mediums and that forms, in the mediums, a curve in the width direction by advancing into the feeding path, wherein
the fourth curve forming portion is in contact with a medium at a position including the nip position between the feed rollers and the separating rollers in the feeding direction or at a portion downstream of the nip position, and is in contact with the medium at a portion between the first separating roller and the second separating roller in the width direction.

5. The medium feeding apparatus according to claim 1, wherein
a state in which torque of a motor is transmitted to the separating rollers in a first rotation direction that sends the mediums upstream in the feeding direction, and a state in which the torque of the motor is transmitted to the separating rollers in a second rotation direction that sends the mediums downstream in the feeding direction are switchable, and
the torque of the motor in the first rotation direction is transmitted to the separating rollers during a feeding operation that sends out the mediums in contact with the feed rollers from the medium mount portion with the feed rollers, and
a feeding preparing operation in which both the feed rollers and the separating rollers are rotated a predetermined amount in respective directions that send the mediums downstream in the feeding direction is performed before starting the feeding operation by transmitting, to the feed rollers, torque in a rotation direction that sends the mediums downstream in the feeding direction and by transmitting, to the separating rollers, torque in the second rotation direction.

6. An image reading apparatus comprising:
a reading member that reads a medium; and
the medium feeding apparatus according to claim 1 that feeds a medium towards the reading member.

7. An image reading apparatus comprising:
a reading member that reads a medium; and
the medium feeding apparatus according to claim 5 that feeds a medium towards the reading member, wherein
an apparatus body including the reading member is supported by a support portion that comes in contact with a mount surface on which the apparatus is mounted, the apparatus body being provided so that a position thereof is changeable relative to the support portion,
the apparatus body is configured to change between
a first position that is a position taken when not in use,
a second position that is a position taken when reading of an original is performed by the reading member, in which a projected area of the apparatus body on the mount surface is larger than that of the first position, and
a third position that is a position taken when reading of an original is performed by the reading member, in which a projected area of the apparatus body on the mount surface is larger than that of the second position,
when the apparatus body takes the second position, the feeding preparing operation is not performed, and
when the apparatus body takes the third position, the feeding preparing operation is performed.

* * * * *